(12) United States Patent
Monfreux-Gaillard et al.

(10) Patent No.: US 7,262,152 B2
(45) Date of Patent: Aug. 28, 2007

(54) REVERSIBLE EMULSIONS STABILIZED BY AMPHIPHILIC POLYMERS AND APPLICATION TO DRILLING FLUID

(75) Inventors: Nathalie Monfreux-Gaillard, Paris (FR); Patrick Perrin, Paris (FR); Françoise LaFuma, Paris (FR); Christopher Sawdon, Par (GB)

(73) Assignee: M-I L.L.C., Houston, TX (US)

( * ) Notice: Subject to any disclaimer, the term of this patent is extended or adjusted under 35 U.S.C. 154(b) by 428 days.

(21) Appl. No.: 10/892,575

(22) Filed: Jul. 16, 2004

(65) Prior Publication Data
US 2004/0259739 A1   Dec. 23, 2004

Related U.S. Application Data

(62) Division of application No. 09/856,740, filed on Jan. 9, 2002, now Pat. No. 6,822,039.

(51) Int. Cl.
*C09K 8/36* (2006.01)
(52) U.S. Cl. .................. 507/120; 507/121; 516/26; 516/27
(58) Field of Classification Search ............. 507/120, 507/121
See application file for complete search history.

(56) References Cited

U.S. PATENT DOCUMENTS

| | | | | |
|---|---|---|---|---|
| 4,921,903 A | * | 5/1990 | Fong | 524/555 |
| 5,208,216 A | * | 5/1993 | Williamson et al. | 507/120 |
| 6,822,039 B1 | * | 11/2004 | Monfreux-Gaillard et al. | 524/555 |

* cited by examiner

*Primary Examiner*—Philip C. Tucker

(57) ABSTRACT

The invention concerns modified hydrophobic polyelectrolytes by amide formation of a hydrophilic skeleton by n-alkylamines whereof the alkyl chain comprises 6 to 22 carbon atoms. Preferably, the amide formation is obtained by di-n-dodecylamine. The hydrophilic skeleton is preferably a sodium polyacrylate or polyacrylic acid corresponding to a statistical acrylate-AMPS copolymer. Said polymers can be used for stabilizing direct or invert emulsions likely to be destabilized or inverted by a modification in the degree of salinity of the aqueous phase or a pH modification. The invention is particularly useful for stabilizing oil drilling fluids or the like in particular drilling, fracturation, acidification or completion fluids.

10 Claims, No Drawings

REVERSIBLE EMULSIONS STABILIZED BY AMPHIPHILIC POLYMERS AND APPLICATION TO DRILLING FLUID

This application is a Divisional Application of U.S. application ser. No. 09/856,740 filed on Jan. 9, 2002, for Invertible Emulsions Stabilized by Amphiphilic Polymers and Application to Bore Fluids now U.S. Pat. No. 6,822,039.

The present invention relates to stabilizing emulsions using amphiphilic polymers. It is of particular application to the preparation of stable emulsions which can be reversed on demand to enable non-miscible liquids to be separated and recovered. The invention also relates to fluids used in drilling, completion or stimulation of hydrocarbon, geothermal or analogous wells.

An emulsion is an example of a colloidal system formed from two non-miscible liquids, one being finely dispersed in the other in the form of droplets. Generally, an emulsion prepared merely by stirring together the two liquids is not stable, and an emulsifying agent has to be added to facilitate emulsion formation and to stabilize it.

Certain applications require emulsions which are stable over a long period but which can easily be destabilized. This is the case with drilling mud used during the construction of hydrocarbon or analogous wells. Drilling mud fulfills a plurality of fundamental functions during construction of a well, among them lubricating and cooling the drilling tool, controlling the hydrostatic pressure in the well to counterbalance the pressure in the traversed formations, and evacuating drill cuttings to the surface.

Drilling mud is classified into three major categories depending on the nature of its continuous phase:
Water-base mud, with a continuous phase essentially formed from water but which may optionally contain additives such as emulsified oil, salts and water-soluble polymers;
oil-base mud, with a continuous phase essentially constituted by oil, with at most 1% to 15% of dispersed water; and
water-in-oil base mud, reverse emulsions which can contain up to 60% water.

Drilling mud also comprises solids such as clays containing additives to control the density of the mud and its suspending power, or solids originating from the drilled formation.

Reverse emulsion types of mud have a multitude of advantages but more and more often these have to be weighed against environmental problems, in particular for offshore drilling. The mud itself is always recycled but the cuttings have to be removed after separating them on the surface using mechanical separator means for separating out solids. Under the strictest regulations, it is permitted to discharge cuttings into the sea only when the cuttings contain less than 1% of organic substances, which amount is greatly exceeded with reverse emulsion type mud because of the film of mud which contaminates the cuttings and which cannot be eliminated using the mechanical means employed.

Proposals have therefore been made to "wash" the cuttings before discharging them to the sea. However, the surfactants added to stabilize the reverse emulsion are so effective that the washing water itself is emulsified in the mud, such that the oil is dispersed very little in the washing water while both the volume and the viscosity of the mud increase. Adding detergents to destabilize such emulsions has also proved to be largely ineffective. Further, such detergents themselves cause environmental problems.

United Kingdom patent GB-A-2 309 240 describes water-in-oil emulsions which are reversed when the salinity of the aqueous phase is reduced simply by adding fresh water or even seawater. This remarkable property is achieved by using combinations of ethoxylate type non-ionic surfactants and sulfonate anionic surfactants as the emulsifying agent. However, such combinations of surfactants cannot produce all of the properties simultaneously, namely endowing the emulsion with high stability, even at high temperatures, while using additives that are biodegradable and of low toxicity.

Recently, a number of authors have proposed using amphiphilic polymers as the emulsifying agent. Most of the work has been directed towards copolymers with polyoxyethylene grafts and has shown that the stability of a direct (oil-in-water) emulsion increases with the proportion of grafts and with their length. Further, R. Y. Lochhead, in particular in ACS Symp. Seris. 462, 101, 1991, and in other articles published with his co-workers, has described hydrophobic modified poly-acrylates, with a hydrophilic backbone formed from a cross-linked high molecular weight polyacrylic acid modified to less than 1 mole % with long chain alkylacrylates or alkylmethacylates or with an undefined proportion of Carbopol hydrophobic residues. The emulsions obtained with high concentrations of such hydrophobic modified polyacrylates are destabilized by adding an electrolyte.

There is a need for particular polymers which can stabilize emulsions.

The present invention provides polyelectrolytes which have been modified to render them hydrophobic by amidification of a hydrophilic backbone by n-alkylamines, preferably di-n-alkylamines, the alkyl chains of which contain 6 to 22 carbon atoms. Amidification is preferably carried out using di-n-dodecylamine $HN-(C_{12}H_{25})_2$.

The proportion of alkylamines introduced into the hydrophilic backbone must be such that the modified polymer is substantially insoluble in pure water. Preferably, it is in the range 0.10 to 0.50 moles of n-alkylamine per mole of hydrophilic polymer.

The hydrophilic backbone is preferably:- a sodium polyacrylate with a molar mass which falls within a wide range; preferably, the mass average molecular mass is in the range 50,000 to 2,000,000, more preferably in the range 100,000 to 1,500,000—or the corresponding polyacrylic acid—or a statistical copolymer of an acrylate and 2-acrylamido-2-methylpropanesulfonic acid (AMPS) with a composition which falls within a wide range. Preferably, the statistical copolymer comprises 0.3 to 0.7 moles of AMPS per mole of acrylate.

More generally, the hydrophilic polymer is a homopolymer or copolymer based on monomers selected from polymers comprising one or more co-monomers selected from acrylic acid, methacrylic acid or any other alkyl derivative substituted in the β position of the acrylic acid, or esters of these acids obtained with mono- or polyalkyleneglycols, acrylamide, methacrylamide, vinylpyrrolidone, itaconic acid, maleic acid, 2-acrylamido-2-methylpropanesulfonate (AMPS), styrene-4-sulfonic acid or vinylsulfonic acid.

The polymers containing the carboxylate or sulfonate acid groups can be completely or partially neutralized by organic bases or metal hydroxides and are then used in the form of salts of an alkali or alkaline-earth metal.

The invention also relates to emulsions stabilized by the modified polymers of the invention, for example paints.

Depending on the degree of modification of the starting monomers, the polymers of the invention are effective as stabilizers for direct or reverse emulsions, the emulsion being able to be destabilized or reversed by reducing the salinity of the aqueous phase or neutralizing the acid. This phenomenon is used to advantage in fluids employed for petroleum or analogous wells, in particular drilling, fracturing, acidizing, or completion fluids. A reverse emulsion is, for example, destabilized (or reversed) by adding fresh water or at least water which is less saline (seawater being the limiting case), sodium hydroxide, potassium hydroxide, sodium or potassium carbonate, or sodium or potassium salts, complexing agents such as polyphosphates, citrates, ethylene diamine tetraacetic acid (EDTA) or sodium nitrilotriacetate (NTA). Destabilizing the emulsion enables the organic phase (oil) to be recovered for recycling, and enables the mineral waste, such as drilling debris, to be eliminated since it is no longer wetted by the oil.

The invention is now described in more detail using the following examples which illustrate methods for synthesizing the polymers of the invention and their emulsion stabilizing properties.

I—Synthesis of Hydrophobic Modified Polyacrylates a) Polyacrylic Acid Precursors Two commercially available polymers were used, provided by Polysciences and Scientific Polymer Products Inc., designated P and PP for the derivative with the highest molecular weight. PP was provided in solid form. P, which is sold in aqueous solution, was diluted to 10% and then freeze-dried. Both compounds were then used in solid form.

The following table shows their analyses in their basic form by size exclusion chromatography in aqueous solution:

| Polymer type: | P | PP |
| --- | --- | --- |
| Peak molar mass (g/mol) | 46000 | 700000 |
| Number average molar mass (g/mol) | 42000 | 74000 |
| Mass average molar mass (g/mol) | 125000 | 1260000 |
| Polydispersity index | 3 | 17 |

The distribution of the two polymers was very wide, but nevertheless it was possible to estimate that the degree of polymerization by weight of polymer PP was 10 times that of P.

PX is the term used below to designate the derivative obtained when X mole % of didodecylamine is introduced to graft polyacrylate P, and PPX is the term used to designate the derivative of polyacrylate PP. The derivatives are said to be moderately grafted if X is over 5 and under 40, and highly grafted if X is 40 or more.

b) Synthesis of Moderately Grafted Derivatives

The reaction of amines with carboxylic acids in an aprotic solvent, N-methyl-2-pyrrolidone, NMP, in the presence of dicyclohexylcarbodiimide (DCC) as a coupling agent was used to modify the polyacrylic acid. Consumption of DCC led to the formation of dicylohexyl-urea-DCU.

EXAMPLE

Synthesis of Polymer P30:

2.27 g of polyacrylic acid (0.03 moles, because the water content was 5% by weight) was dissolved in 60 ml of NMP in a thermostatted bath at 60° C. A first half of the reactants was added: 1.59 g ($9\times10^{-3}$ mol) of amine which had been dissolved in 13 ml of hot NMP, then 1.39 g ($1.35\times10^{-2}$ mol) of DCC dissolved in 7 ml of NMP was introduced dropwise into the flask. The reaction medium was stirred vigorously for 4 hours before introducing the second half of the reactants—amine and DCC—using the same procedure. About 24 hours after the start of the reaction, the flask was cooled in an ice bath. The DCU crystals formed were filtered through n°4 fritted glass. The filtrate was then neutralized by adding 6 equivalents of 10 M sodium hydroxide with vigorous stirring. The filtrate was stirred for 4 hours then filtered through n°4 fritted glass. The precipitate was washed with 20 ml of hot NMP and then with twice 50 ml of methanol. The polymer was purified using a Soxhlet extractor provided with a cellulose cartridge, extracting with hot methanol.

c) Synthesis of Highly Grafted Derivatives

A method similar to that used for the moderately grafted derivatives was used, this time adding one equivalent of dicyclohexylcarbodiimide (DCC) and one equivalent of 1-hydrobenzotriazole (HOBT)—with respect to the amine—to increase the yield of the amidification reaction.

EXAMPLE

Synthesis of Polymers P40 and P'40:

5.25 g (0.07 moles, because the water content in the polymer was 5%) of polyacrylic acid was dissolved in 150 ml of NMP, and stirred for 12 hours at 60° C. 4.96 g (0.028 moles) of di-n-dodecylamine (Didodecylamine), 1.89 g (0.028 moles) of HOBT then 2.88 g (0.028 moles) of DCC were successively introduced after prior dissolution in hot NMP. The second portion of the reactants was added in the same manner four hours later: 4.96 g (0.028 moles) of didodecylamine, 1.89 g (0.028 moles) of HOBT then 2.88 g (0.028 moles) of DCC were successively introduced after prior dissolution in hot NMP. The temperature was kept at 60° C. for 24 hours after initial. introduction of the reactants. The reaction medium was then cooled to 0° C., and the dicyclohexylurea crystals formed were filtered through n°4 fritted glass. The modified polymer was then precipitated by neutralization: 6 equivalents of 10 M sodium hydroxide were added to the filtrate dropwise. After about 12 hours of stirring, the suspension obtained was filtered through n°4 fritted glass, and the polymer was washed with methanol then dried under vacuum at room temperature using a vane pump. The aqueous 10% polymer suspension was dialyzed using a membrane with a cut-off threshold of 12,000 g/mol in an aqueous sodium hydroxide solution stabilized at a pH of 9. After several days of dialysis, when the pH of the medium was stable, the suspension was concentrated and freeze-dried.

For the most hydrophobic derivatives (X>40), a first filtrate in NMP was recovered and treated conventionally. This fraction corresponded to polymer PX. A second fraction was recovered by partial precipitation with dicyclohexylurea. The two compounds were then separated by successive washes with ethyl ether. The solution of the polymer in ether was concentrated and taken up in NMP. This second fraction, P'X, was then treated as for the first fraction.

d) Acidification of Grafted Derivatives

The derivatives obtained in the basic form were changed into their acid form. The polymer, reduced to a powder, was poured into a 0.1 M hydrochloric acid solution. After 12 hours of vigorous stirring, the solution was filtered. The precipitate was washed with pure water then dried under vacuum at room temperature.

We shall now describe grafted polyacrylates and grafted polyacrylic acids, it being understood that the polyacrylates tested were sodium salts.

e) Analysis of Grafted Polyacrylates

Each compound underwent elemental analysis to determine the respective percentages of C, H, N and Na. The ratios $$\frac{\% C}{\% Na} \text{ and } \frac{\% N}{\% Na}$$

enabled X to be deduced.

| | Polymer name | | | | | | | |
|---|---|---|---|---|---|---|---|---|
| | P6 | P15 | P25 | P30 | P40 | P50 | P'50 | PP50 |
| Degree of grafting (%) | 3 | 12 | 22 | 30 | 35 | 51 | 48 | 47 |
| Percentage of water, by weight | 20 | 15 | 8 | 9 | 9 | 10 | 10 | 10 |
| Analysis of modified polyacrylic acids | 99 | 100 | 99 | 94 | 89 | 63 | 61 | 75 | f) Viscosity in Aqueous Solution

The viscosity in aqueous "solution" of the modified polyacrylates was studied for solutions containing 1% of polymer. The least grafted polymer behaved as an associative hydrosoluble polymer: the alkyl grafts associate together in the hydrophobic zones caused physical reticulation of the medium and an increase in the overall viscosity with respect to the precursor polyacrylate. For moderately grafted polymers (more than 10% dialkyl side chains), which were not hydrosoluble, the relative viscosity in water was lower than that of the polyacrylate precursor. For the most highly grafted polymers, which were strongly hydrophobic (P50, p'50 and PP50), the relative viscosity in water was close to 1.

II—Synthesis of Grafted AA-Amps Terpolymers

Terpolymers based on AMPS (2-acrylamido-2-methylpropanesulfonic acid) were prepared in two steps: synthesizing acrylic acid—AMPS copolymers by radical polymerization and hydrophobic modification of these copolymers. In the following examples, acrylic acid/AMPS copolymerizations were carried out with an ammonium peroxodisulfate (APS) and tetramethylene diamine (TEMEDA) combination as an initiator.

A copolymer obtained with y mole % of AMPS monomer synthesized with nQ moles of initiator was designated PAAMPS-y,nQ where 1Q corresponded to $2 \times 10^{-3}$ moles of APS and $10^{-3}$ moles of TEMEDA.

EXAMPLE

Synthesis of PA-AMPS-50, 1Q 7.42 g ($3.58 \times 10^{-2}$ moles) of AMPS, 2.58 g ($3.58 \times 10^{-2}$ moles) of acrylic acid and 0.25 g ($2 \times 10^{-2}$ moles) of APS were dissolved in 100 ml of deionized distilled water and placed in a flask provided with a magnetic stirrer and in an inert atmosphere, at room temperature. The pH was adjusted to 9 by adding sodium hydroxide. After 30 minutes, 0.25 g ($10^{-3}$ moles) of TEMEDA was introduced. After 4 hours, the polymer was precipitated in acetone and vacuum dried. An aqueous 5% solution was prepared and filtered over a membrane with a cut-off threshold of 10,000 g/mol. The dialyzed solution was then concentrated and the aqueous polymer solution thus obtained was changed into its acid form using an ion exchange resin. The solution recovered at the column outlet was concentrated and freeze-dried.

The polymer was grafted using the same procedure as that described for the hydrophobic modified poly-acrylates. The acid form of the copolymers was dissolved in NMP then one equivalent—with respect to AMPS—of sodium hydroxide was added before carrying out the normal grafting procedure. The amidification reaction was carried out in the presence of one equivalent of DCC and one equivalent of HOBT with respect to the amine.

The grafted AA-AMPS terpolymers were designated as C Z X where Z is the percentage of AMPS units in moles and X is the rounded mole percentage of didodecylamine, or effective modification.

The effective degree of modification was determined by $^{13}C$ NMR spectroscopy as a function of the number of moles X' of didodecylamine introduced for grafting. Because of the imprecise nature of the measurements, it was decided to use a rounded value for X to designate the polymer.

| Z | X' | $^{13}C$ NMR | Polymer designation |
|---|---|---|---|
| 40 | 5 | 4 | C-40-5 |
| 40 | 20 | 10 | C-40-10 |
| 40 | 60 | 40 | C-40-40 |
| 60 | 20 | 11 | C-60-10 |
| 60 | 40 | 20 | C-60-20 |
| 60 | 60 | 30 | C-60-30 |

III—Emulsion Stabilized by Grafted Polymers in Accordance with the Invention 10 ml volumes of emulsion were prepared by mixing an aqueous phase (pure water or highly saline water with 20% by weight of sodium or calcium chloride), an organic phase constituted by 1,1-hexadecane and 1% grafted polymer. W4-O6 was the designation given to an emulsion prepared with 4 ml of salt water and 6 ml of 1-hexadecane.

The type of emulsion obtained is known to depend on the order of mixing the components. Thus a precise protocol was used to prepare the emulsions: at room temperature, 100 mg of polymer was stirred for 48 hours in the volume of hexadecane. Then the volume of aqueous phase was added and the mixture was dispersed by stirring for 3 minutes at 24,000 revolutions per minute (rpm).

A - Pure water - hexadecane type emulsions

| Emulsion stabilized by grafted polyacrylates | | | | | | | | | |
|---|---|---|---|---|---|---|---|---|---|
| P50 | | WATER | IN | | | | | | |
| P40 | | OIL | | | | | | | |
| P30 | | | | | | OIL | IN | | |
| P25 | | | | | | WATER | | | |
| P15 | | | | | | | | | |
| | W109 | W208 | W307 | W406 | W505 | W604 | W703 | W802 | W901 |

| Emulsion stabilized by grafted polyacrylates acids | | | | | | | | | |
|---|---|---|---|---|---|---|---|---|---|
| P50 | | WATER | IN | | | | | | |
| P40 | | OIL | | | | | | | |
| P30 | | | | | | | | OIL | IN |
| P25 | | | | | | | | WATER | |
| P15 | | | | | | | | | |
| | W109 | W208 | W307 | W406 | W505 | W604 | W703 | W802 | W901 |

| Emulsion stabilized by grafted AA-AMPS terpolymers | | | | | | | | | |
|---|---|---|---|---|---|---|---|---|---|
| C-40-40 | | WATER | IN | | | | | | |
| C-60-30 | | OIL | | | | | | | |
| C-60-20 | | | | | | OIL | IN | | |
| C-60-10 | | | | | | WATER | | | |
| | W109 | W208 | W307 | W406 | W505 | W604 | W703 | W802 | W901 |

If the polymer is not too hydrophilic (less than 30% grafting for charged polymers; acidification of polyacrylates leading to neutralization of charges), it can be seen that for a given stabilizing polymer, the emulsion could be reversed by changing the volume fraction.

At a given volume fraction, the emulsion could be reversed by increasing the hydrophobic nature of the stabilizing polymer, i.e., by increasing the degree of grafting.

B—Saline-hexadecane Phase Type Emulsions

For these and all of the subsequent tests, a "neutral" composition was selected with half the volume being saline aqueous solution and half the volume being oil. After 24 hours, the percentage by volume which had emulsified and the appearance of the emulsion were recorded. For droplets of millimeter order, the emulsions were said to be millimetrically translucent; finer droplets produced cloudy emulsions; finally, droplets of the order of a micrometer resulted in a white emulsion.

| Emulsion Stabilized by grafted polyacrylates | | | | | | |
|---|---|---|---|---|---|---|
| | Pure water | | 20% NaCl | | 20% CaCl$_2$ | |
| P15 | 80% | O/W white | 70% | O/W translucent | 60% | W/O translucent |
| P25 | 70% | O/W white | 60% | W/O translucent | 60% | W/O translucent |
| P30 | 70% | O/W white | 60% | W/O translucent | 65% | W/O translucent |
| P40 | 80% | O/W white | 55% | W/O cloudy | 65% | W/O translucent |
| P50 | 75% | W/O white | 75% | W/O white | 75% | W/O white |
| P'50 | 70% | W/O white | 75% | W/O white | 75% | W/O white |
| PP50 | 70% | W/O white | 60% | W/O white | 60% | W/O white |

| Emulsion Stabilized by grafted polyacrylates | | | | | | |
|---|---|---|---|---|---|---|
| | Pure water | | 20% NaCl | | 20% CaCl$_2$ | |
| P15 | 30% | W/O white | 65% | W/O translucent | 60% | W/O translucent |
| P25 | 60% | W/O white | 70% | W/O translucent | 60% | W/O translucent |
| P30 | 70% | W/O white | 70% | W/O translucent | 60% | W/O cloudy |
| P40 | 70% | W/O white | 70% | W/O cloudy | 70% | W/O white |
| P50 | 70% | W/O white | 70% | W/O white | 70% | W/O white |
| P'50 | 70% | W/O white | 70% | W/O white | 70% | W/O white |
| PP50 | 70% | W/O white | 70% | W/O white | 70% | W/O white |

-continued

| Emulsion stabilized by grafted AA-AMPS terpolymers | | | | | |
|---|---|---|---|---|---|
| | Pure water | | NaCl 20% | CaCl$_2$ 20% | |
| C-60-10 | 80% | W/O white | No emulsion Polymer precipitated at interface | | |
| C-60-20 | 70% | W/O white | | | |
| C-60-30 | 100% | W/O white | | | |
| C40-40 | 75% | W/O white | 60% | W/O translucent | 60% | W/O white |

IV—Comparative Tests

Non Grafted Polymer Precursors

Emulsions were prepared using the same method as above ("neutral" composition, 1% polymer) from a sodium polyacrylate P, not grafted, and AA-AMPS copolymers, with respectively 40 mole % and 60 mole % of AMPS. The appearance and volume were recorded two hours after preparation.

| | Pure water | 20% NaCl | 20% CaCl$_2$ |
|---|---|---|---|
| Sodium polyacrylate | 5% oil, 60% white O/W emulsion, 35% water | two distinct phases | two distinct phases |
| C-40 | two distinct phases | 5% oil, 85% white O/W emulsion, 10% water | 25% oil, 40% white O/W emulsion, 35% water |
| C-60 | two distinct phases | 5% oil, 85% white O/W emulsion, 10% water | 25% oil, 40% white O/W emulsion, 35% water |
| | | O/W, 5% water | O/W, 30% water |

In all cases, only a direct emulsion could be formed.

Surfactant

Under identical emulsification conditions, emulsions were prepared using two conventional surfactants. Sorbitan monooleate is a non ionic lipophilic surfactant. AOT or sodium bis(2-ethylhexyl)sulfosuccinate is an ionic hydrophilic surfactant.

| | Pure water | | 20% NaCl | | 20% CaCl$_2$ | |
|---|---|---|---|---|---|---|
| Sorbitan monooleate | 80% | W/O white | 80% | W/O white | 80% | W/O white |
| AOT | 75% | O/W white | two clear phases | | two clear phases | |

V—Toxicity of Grafted Polymers of the Invention

The majority of known surfactants used to prepare emulsions are highly toxic; since the polymers of the invention are only slightly soluble in water and have high molecular weights, the toxicity can be lower. This was verified by testing the P50 polymer (sodium polyacrylate) using the growth inhibition method using single-cell marine algae (Algae Skeletonema Costatum).

The concentration which inhibited the growth of 50% of the algae population after 72 hours was more than 10,000 mg/l with polymer P50. With many known surfactants, this same critical concentration is less than 10 mg/l, demonstrating the importance of the polymers of the invention in preparing emulsions in a sensitive medium.

What is claimed is:

1. A method of formulating an invert emulsion drilling fluid, said method comprising:
    mixing an oleaginous fluid, a non-oleaginous fluid, and a polymeric surfactant, wherein the polymeric surfactant is a polyelectrolyte having a hydrophilic backbone which has been amidified by n-alkylamines in which the alkyl chains contain 6 to 22 carbons, wherein the polymeric surfactant is in amounts sufficient to form an emulsion, and
    wherein the hydrophilic backbone is a statistical copolymer of an acrylate and 2-acrylamido-2-methylpropanesulfonic acid.

2. A method of formulating an invert emulsion drilling fluid, said method comprising:
    mixing an oleaginous fluid, a non-oleaginous fluid, and a polymeric surfactant, wherein the polymeric surfactant is a polyelectrolyte having a hydrophilic backbone which has been amidified by n-alkylamines in which the alkyl chains contain 6 to 22 carbons, wherein the polymeric surfactant is in amounts sufficient to form an emulsion, and wherein n-alkylamine is a di-n-alkylamine.

3. A method of formulating an invert emulsion drilling fluid, said method comprising: mixing an oleaginous fluid, a non-oleaginous fluid, and a polymeric surfactant, wherein the polymeric surfactant is a polyeleetrolyte having a hydrophilic backbone which has been amidified by n-alkylamines in which the alkyl chains contain 6 to 22 carbons, wherein the polymeric surfactant is in amounts sufficient to form an emulsion, and wherein n-alkylamine is a di-n-alkylamine.

4. A method of drilling a subterranean well with a drilling fluid, said method comprising:
    mixing an oleaginous fluid, a non-oleaginous fluid, and a polymeric surfactant, wherein the polymeric surfactant is a polyeleetrolyte having a hydrophilic backbone which has been amidified by n-alkylamines in which the alkyl chains contain 6 to 22 carbons, and wherein the hydrophilic polymeric surfactant is in amounts sufficient to form an invert emulsion in which the oleaginous fluid is the continuous phase and the non-oleaginous fluid is the discontinuous phase,
    circulating said invert emulsion within said subterranean well and drilling said subterranean well using said invert emulsion as the drilling fluid.

5. The method of claim 4, wherein the hydrophilic polymer backbone is a homopolymer or copolymer based on monomers selected from acrylic acid, methacrylic acid, or any other alkyl derivatives substituted in the β position of the acrylic acid or esters of these acids obtained with monomers or polyalkyleneglycols, acrylamide, methacrylamide, vinylpyrrolidone, itaconic acid, maleic acid, 2-acrylamido-4-sulfonic acid (AMPS) or vinyl sulfonic acid.

6. The method of claim 4, wherein the hydrophilic polymer backbone is a sodium polyacrylate.

7. The method of claim 4, wherein the hydrophilic backbone is a statistical copolymer of an acrylate and 2-acrylamido-2-methylpropanesulfonic acid.

8. The method of claim 4, wherein n-alkylamine is a di-n-alkylamine.

9. The method of claim 4, wherein the n-alkylamine is di-n-dodecylamine.

10. The method of claim 4, wherein the effective degree of modification of the polymer is in the range 0.10 to 0.50 moles of n-alkylamine per mole of hydrophilic polymer.

* * * * *